US010954807B2

(12) United States Patent
Usseglio et al.

(10) Patent No.: US 10,954,807 B2
(45) Date of Patent: Mar. 23, 2021

(54) SEAL FOR A TURBINE ENGINE (71) Applicant: GE Avio S.r.l., Rivalta di Torino (IT)

(72) Inventors: Matteo Renato Usseglio, Turin (IT); Enrico Ganzitti, Turin (IT)

(73) Assignee: GE AVIO S.r.l., Rivalta di Torino (IT)

( * ) Notice: Subject to any disclaimer, the term of this patent is extended or adjusted under 35 U.S.C. 154(b) by 169 days.

(21) Appl. No.: 15/997,421

(22) Filed: Jun. 4, 2018

(65) Prior Publication Data
US 2018/0355740 A1 Dec. 13, 2018

(30) Foreign Application Priority Data

Jun. 9, 2017 (EP) .................................... 17425062

(51) Int. Cl.
| F01D 11/00 | (2006.01) |
| F01D 11/08 | (2006.01) |
| F16J 15/32 | (2016.01) |
| F01D 9/04 | (2006.01) |
| F01D 25/24 | (2006.01) |

(52) U.S. Cl.
CPC ............ F01D 11/003 (2013.01); F01D 9/042 (2013.01); F01D 11/005 (2013.01); F01D 11/08 (2013.01); F16J 15/32 (2013.01); F01D 25/246 (2013.01); F05D 2220/323 (2013.01); F05D 2240/11 (2013.01); F05D 2240/12 (2013.01); F05D 2240/15 (2013.01); F05D 2240/55 (2013.01); F05D 2240/57 (2013.01)

(58) Field of Classification Search
CPC ...... F01D 9/042; F01D 11/003; F01D 11/005; F01D 11/08; F01D 25/246; F01D 25/26; F05D 2220/323; F05D 2240/11; F05D 2240/12; F05D 2240/15; F05D 2240/55; F05D 2240/57; F16J 15/32
See application file for complete search history.

(56) References Cited

U.S. PATENT DOCUMENTS

| 4,925,365 | A | 5/1990 | Crozet et al. |
| 5,201,846 | A | 4/1993 | Sweeney |
| 6,902,371 | B2* | 6/2005 | Anderson, Jr. ......... F01D 25/14 |
| | | | 415/115 |
| 7,665,957 | B2 | 2/2010 | Khanin et al. |
| 8,104,287 | B2 | 1/2012 | Fischer et al. |

(Continued)

FOREIGN PATENT DOCUMENTS

| CN | 204200279 U | 3/2015 |
| JP | 2007162482 A | 6/2007 |

OTHER PUBLICATIONS

Unofficial EP Search Report dated Dec. 21, 2017 in connection to corresponding EP Application 17425062.1.

(Continued)

Primary Examiner — David Hamaoui
Assistant Examiner — Brian O Peters
(74) Attorney, Agent, or Firm — McGarry Bair PC (57) ABSTRACT An apparatus for turbine engine including a turbine section with at least one turbine stage having a stationary vane assembly and a rotating blade assembly with combustion gases flowing through the turbine stage in a fore to aft direction. An interface is formed between a portion of the outer casing and a portion of the stationary vane assembly defining a leak flow path (LFP) where a seal is placed to retard combustion gases in the leak path.

29 Claims, 6 Drawing Sheets

(56) References Cited

U.S. PATENT DOCUMENTS

| | | |
|---|---|---|
| 8,266,914 B2 | 9/2012 | Hawie et al. |
| 8,734,100 B2 | 5/2014 | Garin et al. |
| 9,133,723 B2 | 9/2015 | Vo et al. |
| 9,353,649 B2 * | 5/2016 | Rioux .................. F01D 25/246 |
| 9,512,734 B2 | 12/2016 | Feldmann et al. |
| 10,344,610 B2 * | 7/2019 | Loiseau ................ F01D 25/246 |
| 2013/0177401 A1 | 7/2013 | Ring |
| 2013/0177437 A1 * | 7/2013 | Amancherla ............ C23C 4/02 |
| | | 416/241 R |
| 2013/0177705 A1 * | 7/2013 | Calla ....................... C23C 24/04 |
| | | 427/201 |
| 2013/0209249 A1 | 8/2013 | Langlois et al. |
| 2014/0241874 A1 | 8/2014 | Rioux |
| 2014/0366556 A1 | 12/2014 | Banks et al. |
| 2015/0102565 A1 | 4/2015 | Feldmann et al. |
| 2016/0201911 A1 | 7/2016 | Ghang et al. |
| 2016/0237854 A1 | 8/2016 | Grant et al. |

OTHER PUBLICATIONS

Chinese Patent Office, Office Action re Corresponding Chinese Application No. 201810588892.X, dated May 7, 2020, 7 pages, China.

* cited by examiner

SEAL FOR A TURBINE ENGINE

BACKGROUND OF THE INVENTION

Turbine engines, and particularly gas or combustion turbine engines, are rotary engines that extract energy from a flow of gases passing through the engine in a series of compressor stages, which include pairs of rotating blades and stationary vanes, through a combustor, and then onto a multitude of turbine blades. In the compressor stages, the blades are supported by posts protruding from the rotor while the vanes are mounted to stator disks. Turbine engines have been used for land and nautical locomotion and power generation, but are most commonly used for aeronautical applications such as for airplanes, including helicopters. In airplanes, turbine engines are used for propulsion of the aircraft.

Turbine engines for aircraft are designed to operate at high temperatures to maximize engine thrust. An outer casing defines a flow path for the turbine engine. Blade assemblies and stationary vane assemblies are coupled to the outer casing at shroud segments and with hangers. In adjacent casing rail and hanger rims axial and radial segment gaps create flow paths allowing unwanted leakage to the outer casing.

BRIEF DESCRIPTION OF THE INVENTION

In one aspect, the present disclosure relates to a turbine engine comprising a turbine section with at least one turbine stage having a stationary vane assembly and a rotating blade assembly, and combustion air flows through the turbine stage in a fore to aft direction, an outer casing surrounding the at least one turbine stage, an interface between a portion of the outer casing and a portion of the at least one turbine stage defining a leak flow path, and a seal coupled to one of the turbine stage and the outer casing to retard the leak flow path.

In another aspect, the present disclosure relates to a turbine engine comprising a turbine section with at least one turbine stage, a vane assembly having a plurality of circumferentially arranged vane segments and terminating in a hanger, an outer casing surrounding the at least one turbine stage and coupled to the vane assembly at a rail, an interface between the hanger and the rail defining a leak flow path, and a seal coupled to one of the vane assembly and the outer casing to retard the leak flow path.

DETAILED DESCRIPTION

The described embodiments of the present invention are directed to sealing an interface between an outer casing and a turbine stage in a turbine section of an engine. For purposes of illustration, the embodiments of the present invention will be described with respect to an aircraft gas turbine engine. It will be understood, however, that the embodiments of the present invention is not so limited and may have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
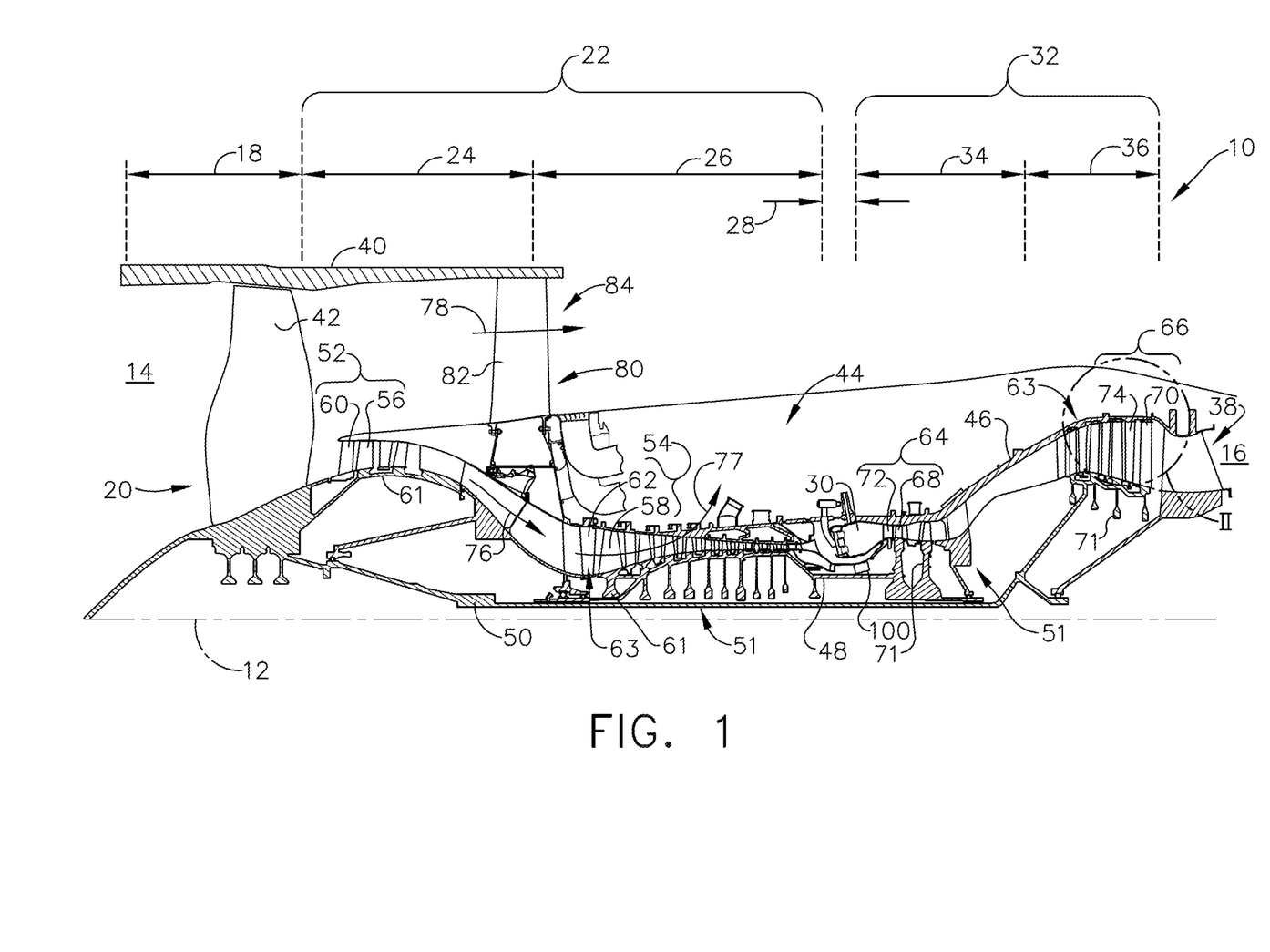
FIG. 1 is a schematic, cross-sectional view of a portion of a turbine engine.

FIG. 1 is a schematic cross-sectional diagram of a portion of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12 and rotatable within the fan casing 40. The HP compressor 26, the combustor 30, and the HP turbine 34 form a core 44 of the engine 10, which generates and extracts energy from combustion gases. The core 44 is surrounded by an outer casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the outer casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the outer casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Combustion gases flow from the combustor 30 through the turbine section 32 in a fore to aft direction. Some work is extracted from these gases by the HP turbine 34, which drives the HP compressor 26. The combustion gases are discharged into the LP turbine 36, which extracts additional work to drive the LP compressor 24, and are ultimately discharged from the engine 10 via the exhaust section 38. The driving of the LP turbine 36 drives the LP spool 50 to rotate the fan 20 and the LP compressor 24.

A portion of pressurized airflow 76 generated in the compressor section 22 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of airflow 78 from the fan section 18 bypasses the LP compressor 24 and engine core 44 and exits the engine assembly 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 is utilized adjacent the fan section 18 to exert some directional control of the airflow 78.

The airflow 78 can be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
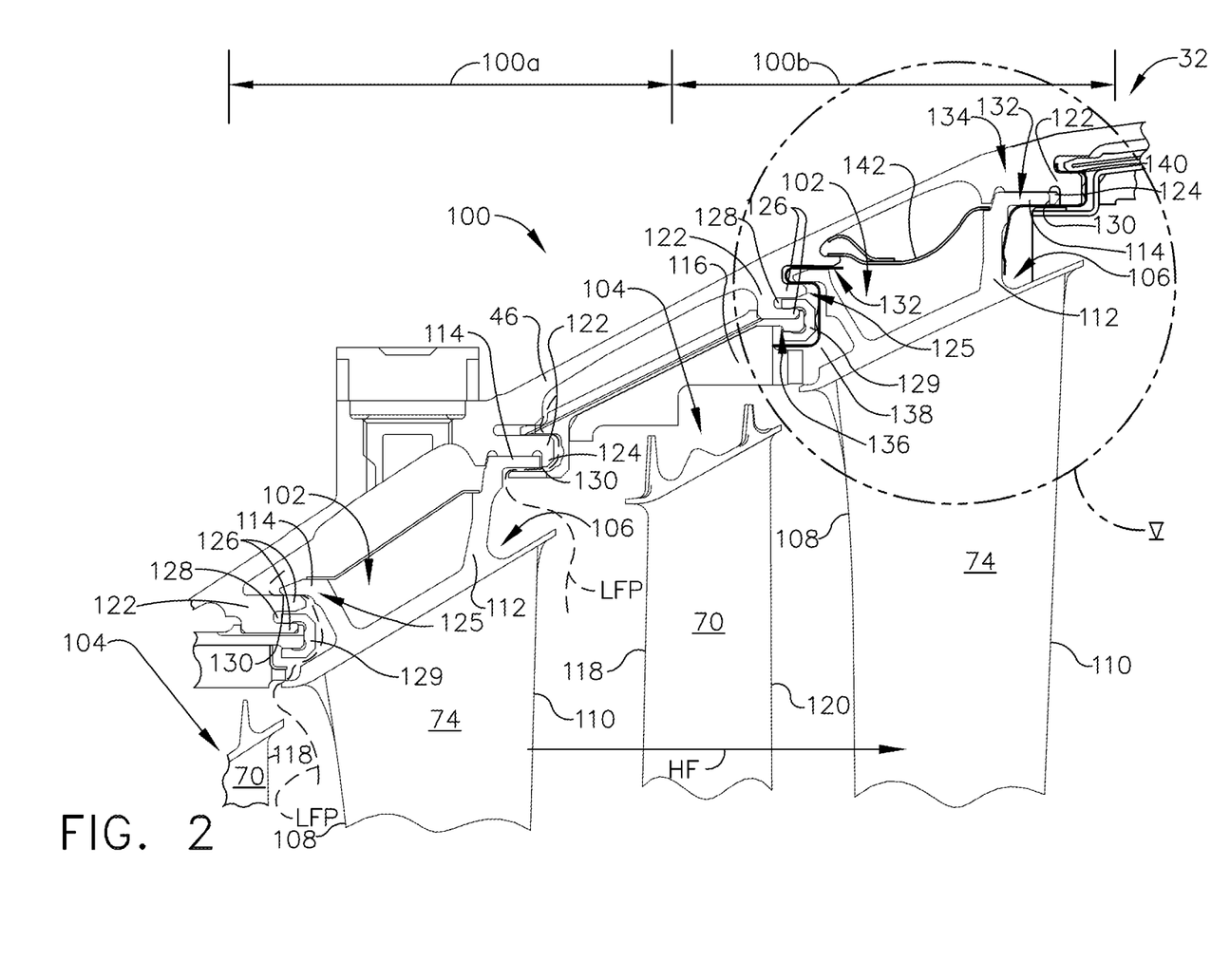
FIG. 2 is an enlarged sectional view of a portion of a turbine section of the turbine engine labelled II in FIG. 1.

FIG. 2 depicts a portion of the turbine section 32 including at least one turbine stage 100. In the illustrated exemplary turbine section 32, two turbine stages 100a, 100b are shown surrounded by the outer casing 46. The outer casing 46 defines a fore to aft hot combustion airflow HF. Each turbine stage 100a, 100b includes at least one airfoil assembly, in particular a stationary vane assembly 102 and a rotating blade assembly 104. The stationary vane assembly 102 includes a plurality of circumferentially arranged segments 106 (at least one pair of vanes) to which the vanes 74 are fixed and through which the hot combustion airflow HF travels. Each vane 74 has a leading edge 108 and a trailing edge 110. The segments 106 can each include a hanger 112 terminating in at least one rim 114 illustrated as two pairs of rims 114, one pair for each hanger 112.

The rotating blade assembly 104 further includes a plurality of circumferentially arranged segments, or shroud segments 116 around the blades 70 and affixed to the outer casing 46 (here showing one shroud segment 116 for blade 70). Each blade 70 has a leading edge 118 and a trailing edge 120.

The outer casing 46 further includes at least one annular rail 122 extending radially inwardly of the outer casing 46 and terminating in a lip 124. The lip 124 can be a pair of axial lips 126 defining at least one recessed portion 128. At least one of the axial lips 126 overlaps with a flange 125 on the rim 114. An annular clamp 129 radially inward of the overlapping lip 126 and flange 125 can extend around the shroud segment 116 and another lip 126 in the annular rail 122 into a recessed portion 128 between the lips 126 to retain the shroud segment 116 to the annular rail 122.

An interface 130 is thus formed between a portion of the outer casing 46 and the hanger 112 in the stationary vane assembly 102 to define a leak flow path LFP. The interface 130 can be multiple annular interfaces including an aft interface 134 formed between the rim 114 and the lip 124 and a fore interface 136 formed between the rim 114 and one of the axial lips 126. The interface 130 can extend in a radial or an axial direction.

A seal 132 is provided at the interface 130. The seal 132 can be multiple seals including a fore seal 138 and an aft seal 140. The aft seal 140 is provided at the aft interface 134 and abuts at least a portion of the hanger 112 and the outer casing 46. The fore seal 138 is radially, inwardly spaced from the outer casing 46 at the fore interface 136 and extends between one of the axial lips 126 and the rim 114 abutting at least a portion of the hanger 112. The fore seal 138 can wrap around the flange 125. A heat shield 142 can extend in a fore to aft direction from the rim 114 radially inwardly of the outer casing 46 to separate the outer casing 46 from the hanger 112. While the seal 132 is illustrated at only one of the turbine stages 100b, it is contemplated that the seal 132 can be at multiple turbine stages 100. It is further contemplated that the seal can be located in other stages, for example but not limited to stages within the compressor section 22.

Figure 3:
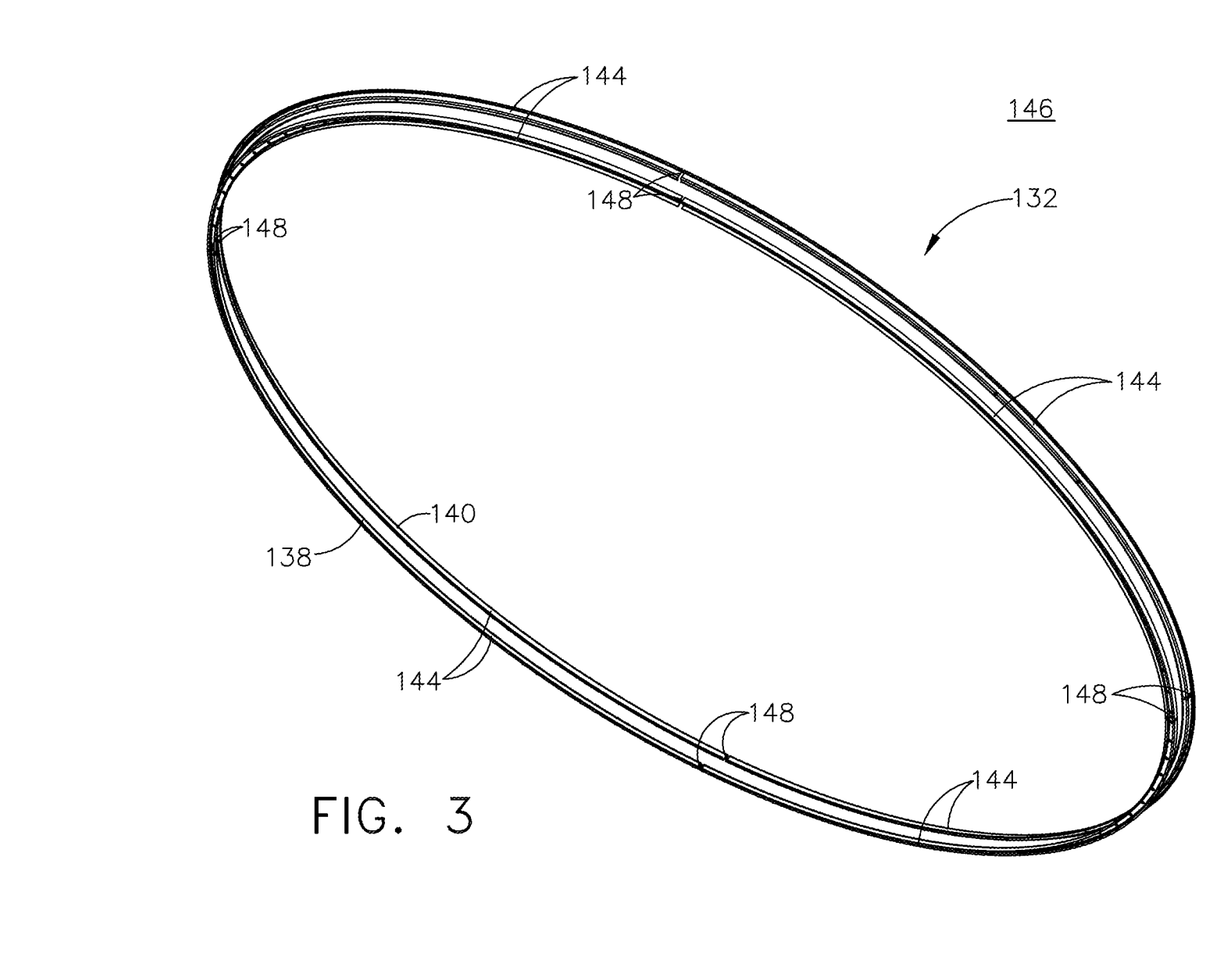
FIG. 3 is an isometric view of a portion of a seal for the turbine section portion of FIG. 2.

Turning to FIG. 3, the seal 132 is illustrated with the fore seal 138 and aft seal 140 shown in pairs of segmented portions 144 to define an annular seal 146. While four pairs of segmented portions 144 are illustrated, more or less pairs of segmented portions 144 are contemplated. Each pair of segmented portions 144 define segmented ends 148 that separate the segmented portions 144 from each other.

Figure 4:
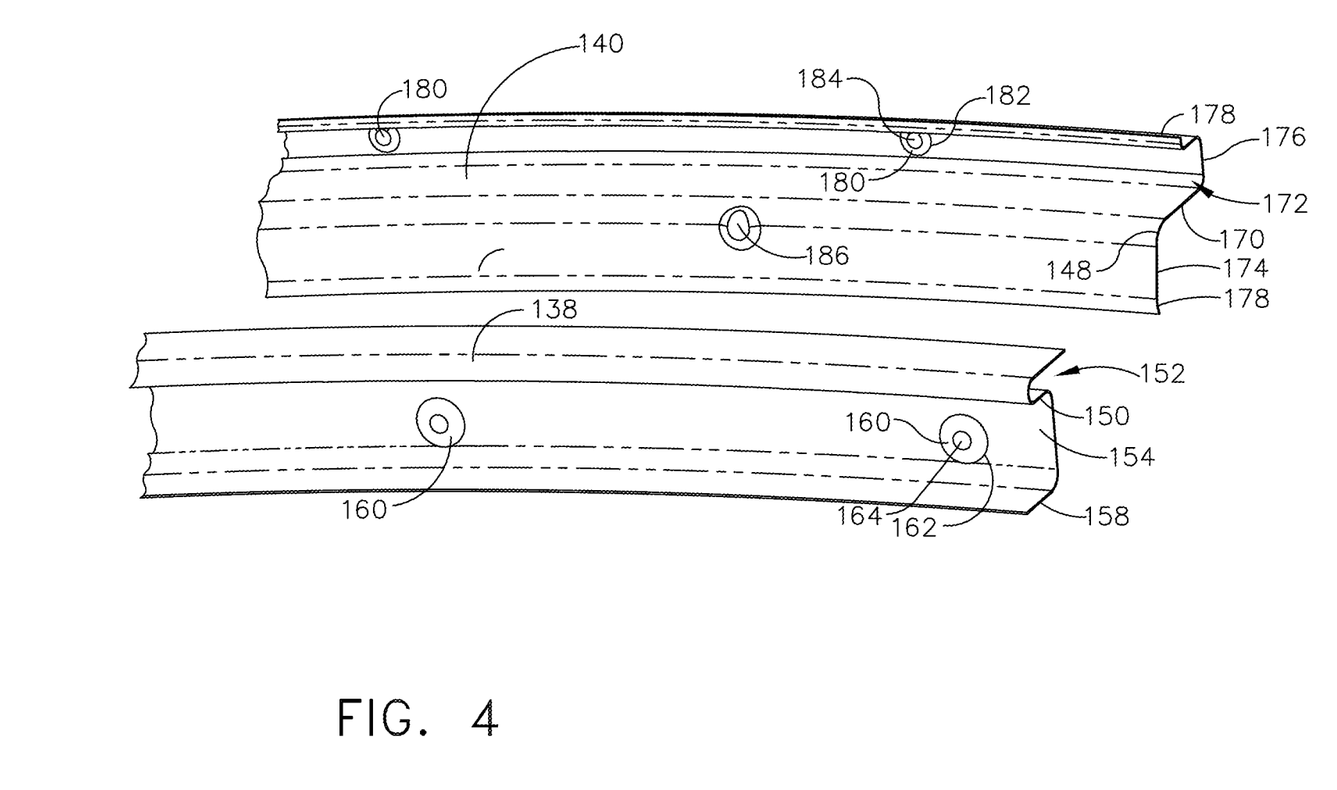
FIG. 4 is an enlarged isometric section of the seal portion of FIG. 3 taken along the line marked IV-IV.

FIG. 4 shows a portion of the fore seal 138 and aft seal 140 at a segmented end 148. The seals 138, 140 can be formed from for example, but not limited to a sheet metal. The material from which the seals 138, 140 are formed can be an anti-wear material, by way of non-limiting example L605 or 188 cobalt sheets. It is further contemplated that the anti-wear material is a lubricant coating on the seals 138, 140. The anti-wear material is not limited to the examples discussed herein and can be any material formed to last under, by way of non-limiting example, rubbing, brazing, friction, grinding, or brushing conditions. The fore seal 138 includes a fore axial projection 150 defining a fore recess 152. A fore radial portion 154 extends radially inwardly from the fore axial projection 150 and terminates in a fore seal lip 158. A fore discrete spacer 160 extends axially from the fore radial portion 154. The fore discrete spacer 160 can have a circular shape 162 and terminate in a peak 164.

The aft seal 140 includes an aft axial projection 170 defining an aft recess 172. A recess wall 176 defines a portion of the aft recess 172. An aft discrete spacer 180 extends axially into the aft recess 172 from the recess wall 176. The aft discrete spacer 180 can have a circular shape 182 and terminate in a peak 184. An aft radial portion 174 extends radially inwardly from the aft axial projection 176. The aft seal 140 terminates at both ends in a set of aft seal lips 178. A secondary aft discrete spacer 186 can extend axially from the aft radial portion 174. The secondary aft discrete spacer 186 can be positioned, in one non-limiting example, circumferentially between and radially inward of consecutive aft discrete spacers 180 as illustrated.

It is contemplated that the discrete spacers 160, 180, 186 can be dimples as illustrated or have other shapes. The circular shape 162, 182 and peak 164, 184 create non-limiting exemplary illustrations of the discrete spacers 160, 180. The discrete spacers 160, 180, 186 can be a plurality of discrete spacers 160, 180, 186 extending along the seals 138, 140 to form an annular set of discrete spacers 160, 180, 186.

Figure 5:
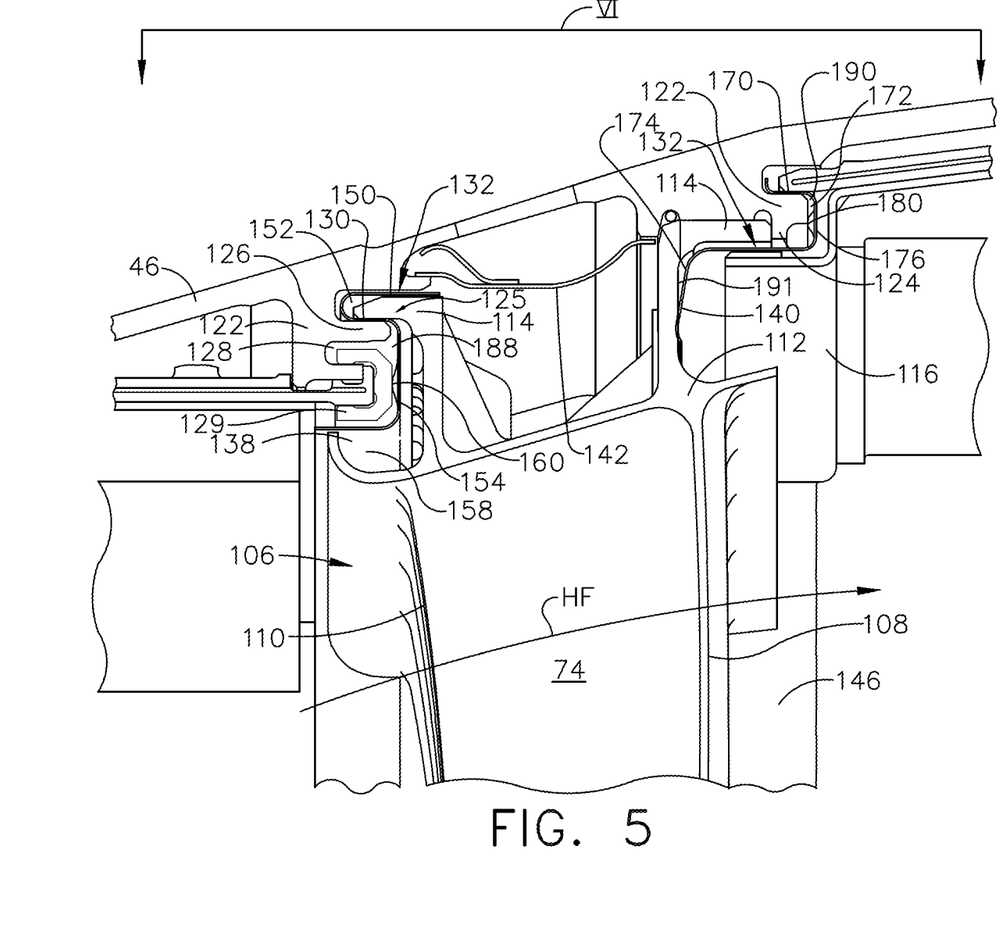
FIG. 5 is an enlarged sectional view of a stationary vane assembly and outer casing of a portion of the turbine section labelled V in FIG. 2.

In FIG. 5, the seal 132 is illustrated in more detail and it can more clearly be seen that the annular clamp 129 holds the shroud segment 116 to the outer casing 46 at the recess 128 formed by the axial lips 126. The fore discrete spacer 160 can abut the annular clamp 129 to form a fore insulating air gap 188. The aft discrete spacer 180 can abut the annular rail 122 to form an aft insulating air gap 190. While not visible, the secondary aft discrete spacer 186 can form a secondary aft insulating air gap 191 between the hanger 112 and shroud segment 116. It is contemplated that one or all of the discrete spacers 160, 180, 186 can form insulating air gaps 188, 190, 191 between any portion of the outer casing 46 and the seals 138, 140.

The insulating air gaps 188, 190, 191 provide an insulation barrier to minimize heat transfer by convection between the surrounding outer casing 46 and the hot combustion airflow HF in the turbine section 32. Providing the discrete spacers 160, 180, 186 intermittently along the fore and aft seals 138, 140 prevents unnecessary heat conduction from the seal 128, 140 to the outer casing 46.

The heat shield 142 provides a barrier between the hanger 112 and the outer casing 46. The fore and aft seals 138, 140 extend circumferentially beyond the nozzle segment 106. Together the heat shield 142, fore seal 138, and aft seal 140 provide a barrier to block unwanted leakage of the hot combustion airflow HF to the outer casing 46.

Figure 6:
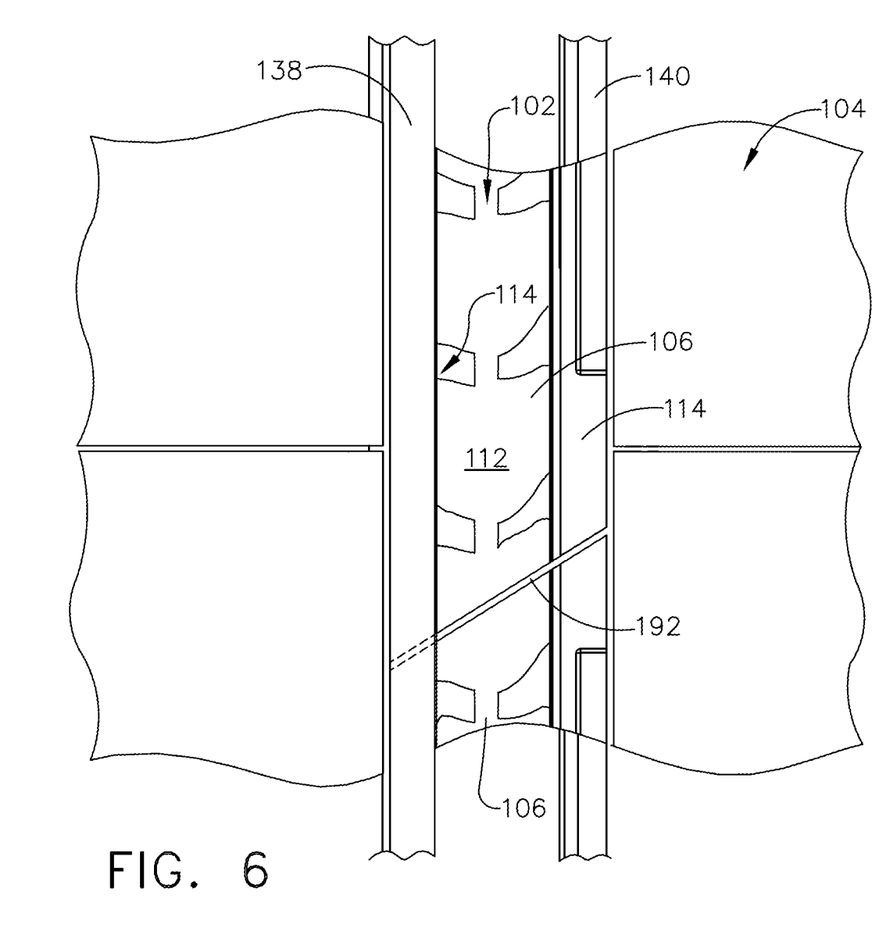
FIG. 6 is a top view of the stationary vane assembly along line VI of FIG. 5 with the outer casing and a portion of the seal removed.

FIG. 6 is a top view of the stationary vane assembly 102 and rotating blade assemblies 104 with the heat shield 142 removed for clarity. A gap 192 exists where the nozzle segment 106 of the stationary vane assembly 102 meets an adjacent nozzle segment 106. The fore and aft seals 138, 140 extend across the gap 192 to further retard any leakage of hot combustion airflow HF along the leak flow path LFP (FIG. 2). In the top view perspective, it can be seen that the fore seal 138 circumferentially covers the gap 192 and the aft seal 140 extends circumferentially just below the gap 192.

Benefits associated with the seal as described herein include minimizing corrosion, de-coloration and cracks along the rails. Outer casing material is known to be manufactured with a high temperature capability and a non-repairable alloy. Decreasing the amount of heat transfer decreases corrosion and de-coloration, while providing the seals at the interfaces as described herein minimizes cracks and provides wear protection against wear between the outer casing the connecting hardware, for example but not limited to the interface between the rails and rims. The seal, therefore decreases the scrap amounts during overhaul of the engine saving cost in maintenance and materials. Additionally the seals reduce bypass leakages, providing a benefit to engine performances in terms of both turbine efficiency and cooling flow reduction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A turbine engine comprising:
   a turbine section with at least one turbine stage having a stationary vane assembly and a rotating blade assembly, where combustion gases flow through the at least one turbine stage in a fore to aft direction;
   an outer casing surrounding the at least one turbine stage;
   an interface between a portion of the outer casing and a portion of the stationary vane assembly defining a leak flow path, the interface comprising an aft interface and a fore interface; and
   a seal coupled to one of the stationary vane assembly and the outer casing to retard combustion gases in the leak flow path, the seal comprising an aft seal and a fore seal;
   wherein the fore seal is radially, inwardly spaced from the outer casing and includes a fore discrete spacer extending axially from the fore seal, terminating in a peak upstream from the fore seal, and axially spacing the fore seal from the outer casing to define at least one fore insulating air gap.

2. The turbine engine of claim 1 wherein the stationary vane assembly terminates in a hanger including at least one rim.

3. The turbine engine of claim 2 wherein the aft seal abuts at least a portion of the hanger and the outer casing.

4. The turbine engine of claim 3 wherein the fore seal abuts at least a portion of the hanger at the at least one rim and the outer casing.

5. The turbine engine of claim 4 wherein a heat shield extends in the fore to aft direction from the at least one rim between the outer casing and the hanger.

6. The turbine engine of claim 1 wherein the stationary vane assembly terminates in a hanger comprising at least one rim and the outer casing comprises at least one rail adjacent the at least one rim and the interface is defined between the at least one rail and the at least one rim.

7. The turbine engine of claim 6 wherein the interface extends in one of a radial direction or an axial direction.

8. The turbine engine of claim 7 wherein the seal abuts one of the at least one rim and the at least one rail.

9. The turbine engine of claim 8 wherein the seal wraps around a flange in the at least one rim that overlaps a lip in the at least one rail.

10. The turbine engine of claim 9 wherein the aft seal is spaced from the at least one rail with an aft discrete spacer to define at least one aft insulating air gap between the hanger and the at least one rail.

11. The turbine engine of claim 10 wherein the aft discrete spacer is a dimple extending from the aft seal to maintain the at least one aft insulating air gap.

12. The turbine engine of claim 8 wherein the seal comprises an annular seal.

13. The turbine engine of claim 12 wherein the aft seal is spaced from the at least one rail with an aft discrete spacer to define at least one aft insulating air gap between the hanger and the at least one rail.

14. The turbine engine of claim 13 wherein the aft discrete spacer is a dimple extending from the seal.

15. The turbine engine of claim 1 wherein the rotating blade assembly further includes a plurality of circumferentially arranged shroud segments radially, inwardly coupled to the outer casing and the shroud segments are coupled to the outer casing via an annular clamp, wherein the fore discrete spacer extends from the seal toward the annular clamp to define the at least one fore insulating air gap.

16. The turbine engine of claim 1 wherein the interface comprises multiple annular interfaces circumscribing the at least one turbine stage and the seal comprises a plurality of seal segments circumferentially arranged around the at least one turbine stage at the multiple annular interfaces.

17. The turbine engine of claim 16 further including at least one aft discrete spacer extending from each of a plurality of aft seal segments to space the plurality of aft seal segments from the outer casing defining at least one aft insulating air gap.

18. The turbine engine of claim 1 wherein at least a portion of the seal is made of an anti-wear material.

19. A turbine engine comprising:
a turbine section with at least one turbine stage for a flow of combustion gases;
an airfoil assembly having a plurality of circumferentially arranged airfoil segments and terminating at a circumferentially arranged segment;
an outer casing surrounding the at least one turbine stage, comprising a rail, and coupled to the airfoil assembly at the rail;
an interface between the circumferentially arranged segment and the rail defining a leak flow path; and
a seal coupled to one of the airfoil assembly and the outer casing to retard combustion gases in the leak flow path;
wherein the seal is spaced from the rail with at least one discrete spacer extending axially from the seal, terminating in a peak upstream from the seal, and axially spacing the seal from the at least outer casing to define at least one insulating air gap between the circumferentially arranged airfoil segment and the rail.

20. The turbine engine of claim 19 wherein the interface comprises an aft interface and a fore interface.

21. The turbine engine of claim 20 wherein the seal comprises an aft seal and a fore seal.

22. The turbine engine of claim 21 wherein the fore seal is radially, inwardly spaced from the outer casing and the at least one discrete spacer is a fore discrete spacer defining at least one fore insulating air gap.

23. The turbine engine of claim 22 wherein the aft seal abuts at least a portion of the circumferentially arranged segment and the outer casing.

24. The turbine engine of claim 23 wherein the circumferentially arranged segment includes at least one rim and the fore seal abuts at least a portion of the circumferentially arranged segment at the at least one rim and the outer casing.

25. The turbine engine of claim 24 wherein a heat shield extends in a fore to aft direction from the at least one rim between the outer casing and the circumferentially arranged segment.

26. The turbine engine of claim 25 wherein the circumferentially arranged segment is a hanger and the airfoil assembly is a stationary vane assembly.

27. The turbine engine of claim 19 wherein the seal comprises an annular seal and the at least one discrete spacer is multiple discrete spacers separating the outer casing from the airfoil assembly to define multiple insulating air gaps.

28. The turbine engine of claim 27 wherein the at least one discrete spacer is a dimple extending from the seal.

29. The turbine engine of claim 28 wherein the seal comprises an aft seal and a fore seal and at least a portion of one of the aft seal or fore seal is made of an anti-wear material.

* * * * *